US006195647B1

(12) United States Patent
Martyn et al.

(10) Patent No.: US 6,195,647 B1
(45) Date of Patent: Feb. 27, 2001

(54) ON-LINE TRANSACTION PROCESSING SYSTEM FOR SECURITY TRADING

(75) Inventors: Peter Martyn, Ridgewood, NJ (US); Mark DeNat, Bedford; Diane Geberth Hall, Laremont, both of NY (US); Ira Slomowitz, Saba (IL); Maureen Franke, Jersey City; Mei Pang, West Orange, both of NJ (US); Edward Flynn, Newtown, CT (US); Mike Waldo, Danberry, CT (US); Pam Sweet, Beacon Falls, CT (US); Deane Coords, Woodbridge, CT (US)

(73) Assignee: The Nasdaq Stock Market, Inc., Washington, DC (US)

( * ) Notice: Subject to any disclaimer, the term of this patent is extended or adjusted under 35 U.S.C. 154(b) by 0 days.

(21) Appl. No.: 08/722,847

(22) Filed: Sep. 26, 1996

(51) Int. Cl.[7] .................................................. B06F 17/60
(52) U.S. Cl. .................................. 705/37; 705/35; 705/36
(58) Field of Search ........................ 705/37, 36, 35; 345/333

(56) References Cited

U.S. PATENT DOCUMENTS

| 4,412,287 | * | 10/1983 | Braddock, III ........................ 705/37 |
| 4,674,044 | * | 6/1987 | Kalmus et al. ........................ 705/37 |
| 4,750,135 | * | 6/1988 | Boilen .................................. 709/231 |
| 5,038,284 | * | 8/1991 | Kramer ................................. 705/37 |
| 5,077,665 | * | 12/1991 | Silverman et al. ..................... 705/37 |
| 5,101,353 | * | 3/1992 | Lupien et al. ......................... 705/37 |
| 5,270,922 | * | 12/1993 | Higgins ................................. 705/37 |
| 5,297,031 | * | 3/1994 | Gutterman et al. ................... 705/37 |
| 5,297,032 | * | 3/1994 | Trojan et al. .......................... 705/37 |
| 5,319,382 | * | 6/1994 | Fitzpatrick et al. ................. 345/118 |
| 5,339,392 | * | 8/1994 | Risberg et al. ...................... 345/333 |
| 5,375,055 | * | 12/1994 | Togher et al. ......................... 705/37 |
| 5,490,245 | * | 2/1996 | Wugofske ............................. 345/349 |
| 5,774,878 | * | 6/1998 | Marshall ............................... 705/36 |
| 6,014,643 | * | 1/2000 | Minton .................................. 705/37 |
| 6,029,146 | * | 2/2000 | Hawkins et al. ...................... 705/35 |

FOREIGN PATENT DOCUMENTS

| 2191069 | * | 12/1987 | (GB) | ............................. G06F/15/30 |
| WO 91/13518 | * | 9/1991 | (WO) | ............................. G06F/3/14 |
| WO 92/12488 | * | 7/1992 | (WO) | ............................. G06F/15/20 |
| WO 94/08309 | * | 4/1994 | (WO) | ............................. G06F/15/20 |

OTHER PUBLICATIONS

ADS Associates, Inc., "ADS Links Traders, Pricing and the Back Office via PCs", Dialog File 16:Gale Group PROMT, p. 11, Dec. 1986.*

Bonner, Paul, "Do–it–yourself Windows Broker Use Windows' Dynamic Data Exchange to Create a Custom Trading System on Your PC That Automates the Purchase, Sale, and Management of . . .", PC Computing, vol. 4, No. 6, pp. 172–186, Jun. 1991.*

Weaver, T., "Critical Financial Market System Fault Tolerant Real–Time Client Server Architecture", IEE Colloquim on Designing Resilient Architectures Conference, Digest No. 170 pp. 4/1–3, 1991.*

(List continued on next page.)

Primary Examiner—Edward R. Cosimano
Assistant Examiner—John W. Hayes
(74) Attorney, Agent, or Firm—Fish & Richardson P.C.

(57) ABSTRACT

A data processing system provides an interface with a securities exchange system over which securities are traded. The system allows a user to configure displays tailored for specific functions and to show displays for a particular security. The user may also view a display showing information about selected securities, monitor trade activity, participate in a trade, and report trades. In addition, a user may display information for a selected set of securities on a continuously updated basis and can easily select from a displayed list, a desired security and certain information and functions associated with the selected security.

29 Claims, 14 Drawing Sheets

OTHER PUBLICATIONS

Smith, Carrie, "The New Nasdaq", Wall Street & Technology, Dialog File 16:Gale Group PROMT, Jun. 1994.*

Data Broadcasting Corporation, "DBC Announces New Stock Market Charting Software and Trading Data with The Releases of Signal 1.2 and Quotrek 7.0", News Release, Dialog File 16:Gale Group PROMT, Jan. 1996.*

"Workstations and Analytics: Coming in September NASDAQ Workstation II", Trading Systems Technology, vol. 6, No. 13, Jan. 11, 1993.*

Kindel, Sharon, "Starting Over (NASDAQ Market System to Replace Computer System)", Financial World, vol. 160, No. 12, p. 52, Jun. 8, 1993.*

"NASDAQ Dumps In–House System; Taps MCI for Virtual Private Net", Wall Street Network News, vol. 2, No. 6,10 Sep. 1993.*

Berkely, Alfred R, "NASDAQ's Technology Floor: Its President Takes Stock", IEEE Spectrum, Feb. 1997.*

* cited by examiner

ON-LINE TRANSACTION PROCESSING SYSTEM FOR SECURITY TRADING

BACKGROUND OF THE INVENTION

The present invention relates generally to online processing of transactions in a multi-user environment. More particularly, the present invention relates to a transaction processing system for a securities market.

In a securities market, traders buy and sell securities using offers and bids. Although the term "security" usually means a share in a corporation, the term may have a broader meaning which is proper for a full understanding of this invention. The chief characteristic of a security for purposes of this invention is that it may be traded over a common system or exchange.

Sellers advertise "offers" or prices at which they will sell their securities, and buyers transmit "bids" or prices at which they will buy securities. Of course, sellers attempt to sell at the highest price while buyers attempt to buy at the lowest price. The "inside quote," which is the highest offer or the lowest bid, represents the best price for sellers and buyers.

To compete effectively, traders require certain information to determine when they have the most advantageous situation to sell or buy. That information includes what other traders are offering or bidding.

Traditionally, traders exchanged their orders on a stock floor such as the New York or American Stock Exchanges. The National Association of Securities Dealers, Inc. (NASD), however, created an on-line transaction processing system for trading securities. This system allows traders to make quotes and find inside quotes quickly and easily. To use this system, NASD supplies its users with workstations having screen displays, some of which may be customized and some of which are fixed. This system provided capabilities and services that traditional systems did not.

An object of this invention is to advance the current system and provide additional information to traders about securities and the securities market that responds quickly to the fast-paced securities market, flexible.

Another object of this invention is a system to allow traders to make and report trades simply and easily.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

SUMMARY OF THE INVENTION

To achieve the objects and in accordance with the purpose of the invention embodied and broadly described herein, the present invention includes a method of customizing the displays according to this invention that operates in a data processing system providing a user an interface with a securities exchange system over which securities are traded. A system display database contains information to be shown in system displays that show information about the securities exchange system. The method comprises the steps, implemented by the data processing system, of: receiving from a user a first input requesting a maintenance display indicating which system display shows information about a desired security; displaying, in response to the first input, the maintenance display; receiving a second input from the user indicating a change in the system display that shows the information about the desired security; and updating the system display database to reflect the changes indicated by the second input.

Another method according to this invention of providing information on a desired security uses a data processing system providing a user interface with a securities exchange system for trading securities. The users trade securities that have an associated set of information. The method comprises the steps, implemented by the data processing system, of: receiving, from a user a first input requesting a display for the desired security, the display containing a predetermined subset of information selected from the set of information associated with the desired security; displaying the display containing a predetermined subset of information for the desired security; receiving a second input from the user specifying a trade of the desired security; executing the trade; and reporting the trade to the securities exchange system.

Yet another method of providing information on selected securities according to this invention also operates in a data processing system providing an interface with a securities exchange system for trading securities in which users trade securities according to offers and bids. The method comprises the steps, implemented by the data processing system, of: receiving from a user a first input requesting a ticker display containing information associated with a selected set of securities; displaying the ticker display; scrolling the selected information across the ticker display in a predetermined scroll direction; receiving from a user a second input changing the information associated with the selected set of securities; and scrolling the changed selected information.

A further method of providing information to a user on selected securities according to this invention operates also in a data processing system that provides a user interface with a securities exchange system for trading securities. The method comprises the steps, implemented by the data processing system, of: creating a first window containing a plurality of icons each associated with a different security; displaying the first window; receiving from the user a second input selecting one of the plurality of icons; and displaying, in response to the second input, a second window containing information and functions associated with the security associated with the selected icon.

Both the foregoing general description and the following detailed description are only exemplary and explanatory and do not restrict the invention as claimed.

The accompanying drawings, which are incorporated in and constitute a part of this specification, illustrate embodiments of the invention and together with the description, serve to explain the principles of the invention.

DESCRIPTION OF THE PREFERRED EMBODIMENTS

Reference will now be made in detail to preferred embodiments of this invention, examples of which are illustrated in the accompanying drawings. Wherever possible, the same reference numbers will be used throughout the drawings to refer to the same or like parts or steps. The following description is organized as follows:

A. Introduction
B. System Overview
C. Dynamic Quote
D. Dynamic Quote Plus
E. Quick Quote
F. Quickpik
G. Ticker
H. Symbol Maintenance
I. Conclusion A. Introduction The preferred embodiment of the invention is a NASDAQ Workstation II (NWII). NWII provides users with information necessary for monitoring and trading securities over a securities exchange system. NWII provides users who are traders with the information they need to make quick decisions so they can respond to market conditions quickly and maximize profits. NWII also allows traders to tailor information to suit their individual needs.

To obtain a complete understanding of the operation of the preferred embodiments, certain terms must be understood. Investors buy a "security" with the expectation of receiving a share of the profits made by a corporation. Security trading begins when a party having a security or acting for an owner of a security sets an "offer" price and a potential purchaser sets a "bid" price. A "quote" may be an "offer" price, a "bid" price, or a combination of both an "offer" and "bid" price.

When a seller and a buyer agree to a particular price for a security, they complete a "trade." Trades are initiated and completed by individuals, firms, dealers, who may be either individuals or firms, and brokers.

The competing interests between sellers and buyers create the market and define its operation. As discussed above, the situation representing the best price for sellers and buyers is called the "inside quote." The inside quote consists of the highest offer and the lowest bid. Other important terms to know are market maker, bid market depth and offer market depth. Market maker is a trading firm registered with the securities exchange system to trade a predetermined amount of a desired security. Bid market depth is the number of market makers making bids on a desired security. Offer market depth is the number of market makers making offers on the desired security.

B. System Overview

Figure 1:
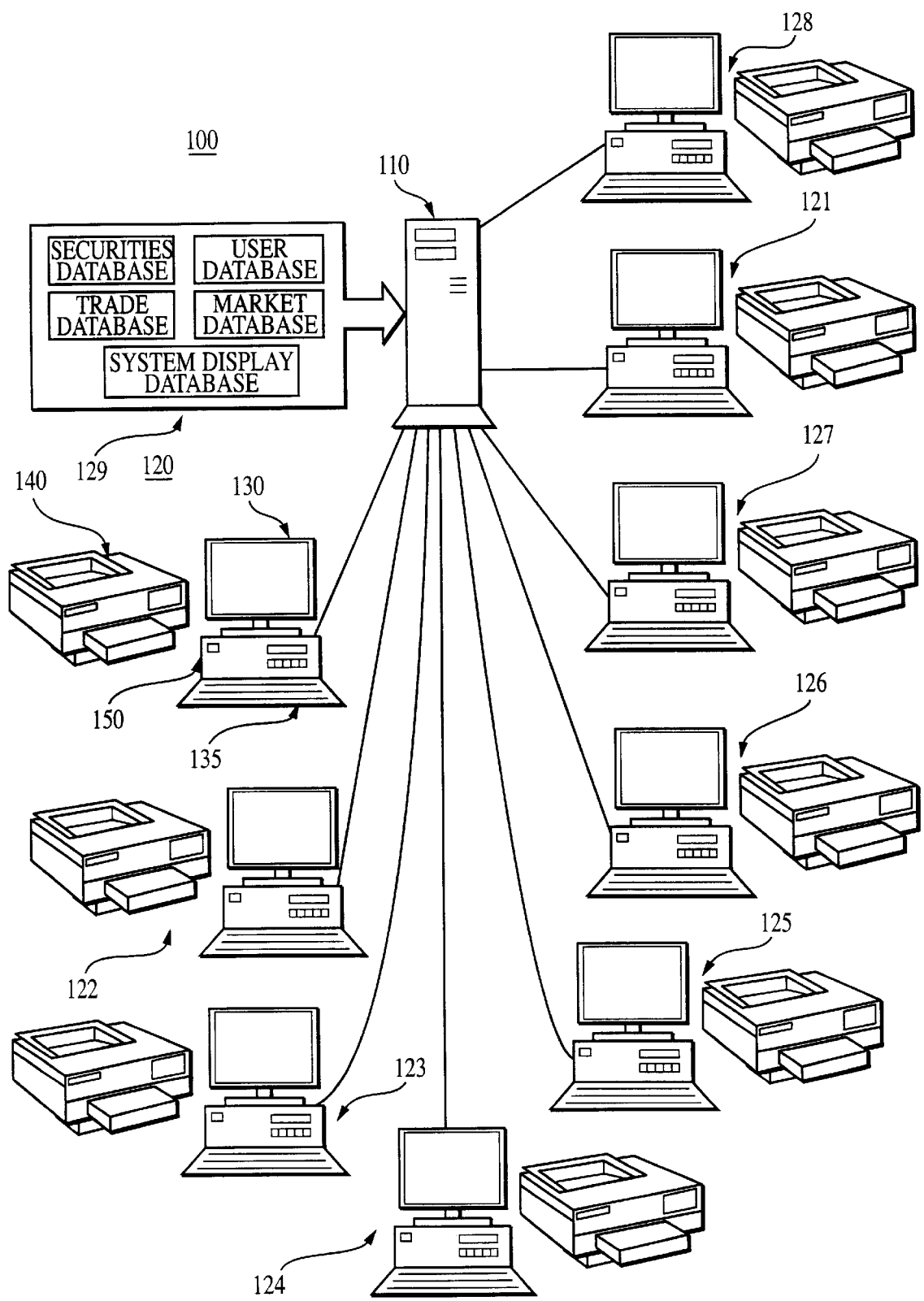
FIG. 1 is an illustration of the NWII hardware system architecture according to a preferred embodiment of the present invention.

FIG. 1 shows a diagram of an automated securities system 100 capable of implementing the present invention. System 100 includes a central computer 110 and several work stations 120, 121, 122, 123, 124, 125, 126, 127, and 128. Central computer 110 and work stations 120–128 can be any equipment capable of performing the functions described below.

Each work station 120–128 preferably includes a display 130, a keyboard/input device 135, a printer 140, and a processing unit/memory 150. Processing unit/memory 150 generates various windows shown on display 130, prints out information on printer 140, receives user inputs from keyboard/input device 135, and communicates with central computer 110. Processing unit/memory 150 also performs various local logical and arithmetic operations as required. Both central computer 110 and workstations 120–128 contain portions of the software which make up the NWII software system.

In general, workstations 120–128 contain those portions of the NWII software that interact directly with NWII users, including data presentation and display, data transfer with central computer 110, and storage in system display databases of user-defined information. That information includes transaction information that contains identifying parameters for trading securities over the securities exchange system.

Central computer 110 contains those portions of the NWII software that interact with workstations 120–128, manipulate database information 129 about securities and users, and communicate with other data processing systems (not shown). Also, although the description of the preferred embodiment is given with reference to window-based user interface, many different types of display interface may be used to implement this invention.

To participate in the automated securities trading of this invention, an NWII user must log onto the system. Each NWII user has a corresponding ID and password. A user's ID is associated with a firm to which a particular workstation is registered.

Figure 2:
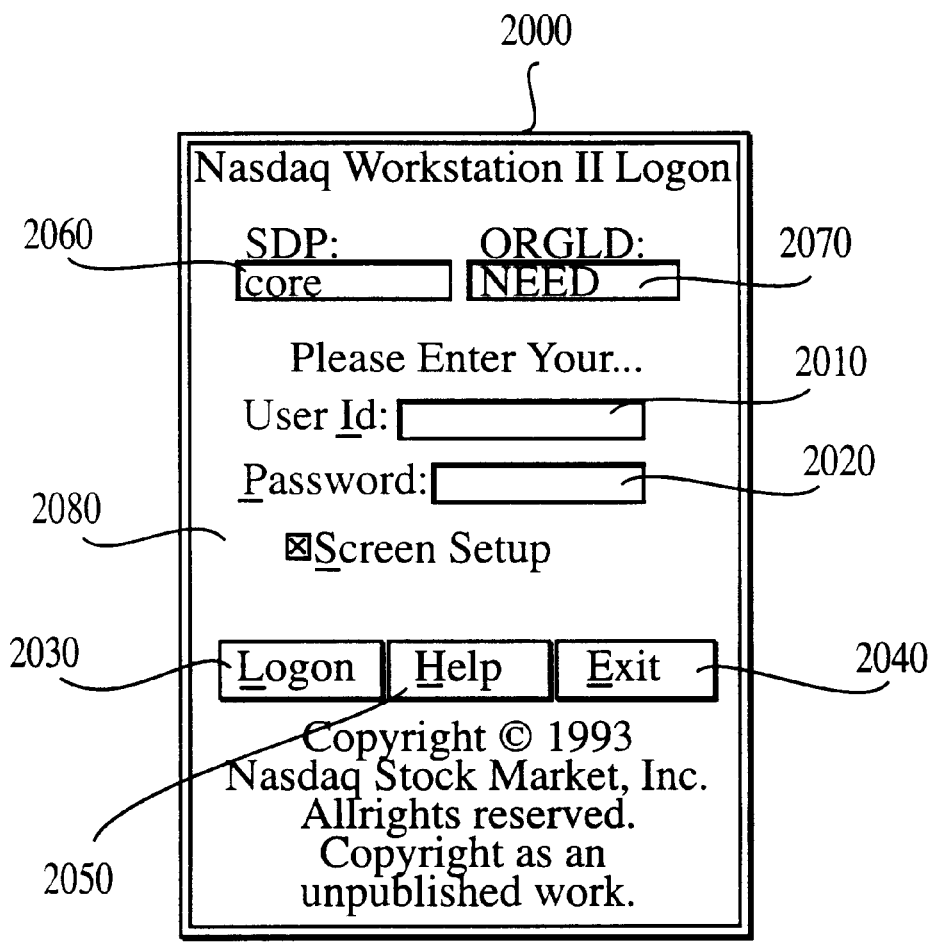
FIG. 2 is an illustration of a Logon window of the preferred embodiment of the present invention.

The NWII software residing on workstations 120–128 initially presents a Logon window 2000 as shown in FIG. 2. The user enters an ID in text box 2010 and password in text box 2020, and either selects Logon button 2030 to execute a logon process, Help button 2050 for help, or Exit button 2040 to exit.

Logon window 2000 also includes SDP text area 2060 and OrgId text area 2070. The user's system places the user's service delivery platform name in SDP text area 2060 and the user's organization identification in OrgId text area 2070 automatically when Logon window 2000 is opened.

Logon window 2000 also includes Screen Setup box 2080. If the user selects Screen Setup box 2080, the NWII software opens an initial display as configured when the user last exited the NWII software.

Figure 3:
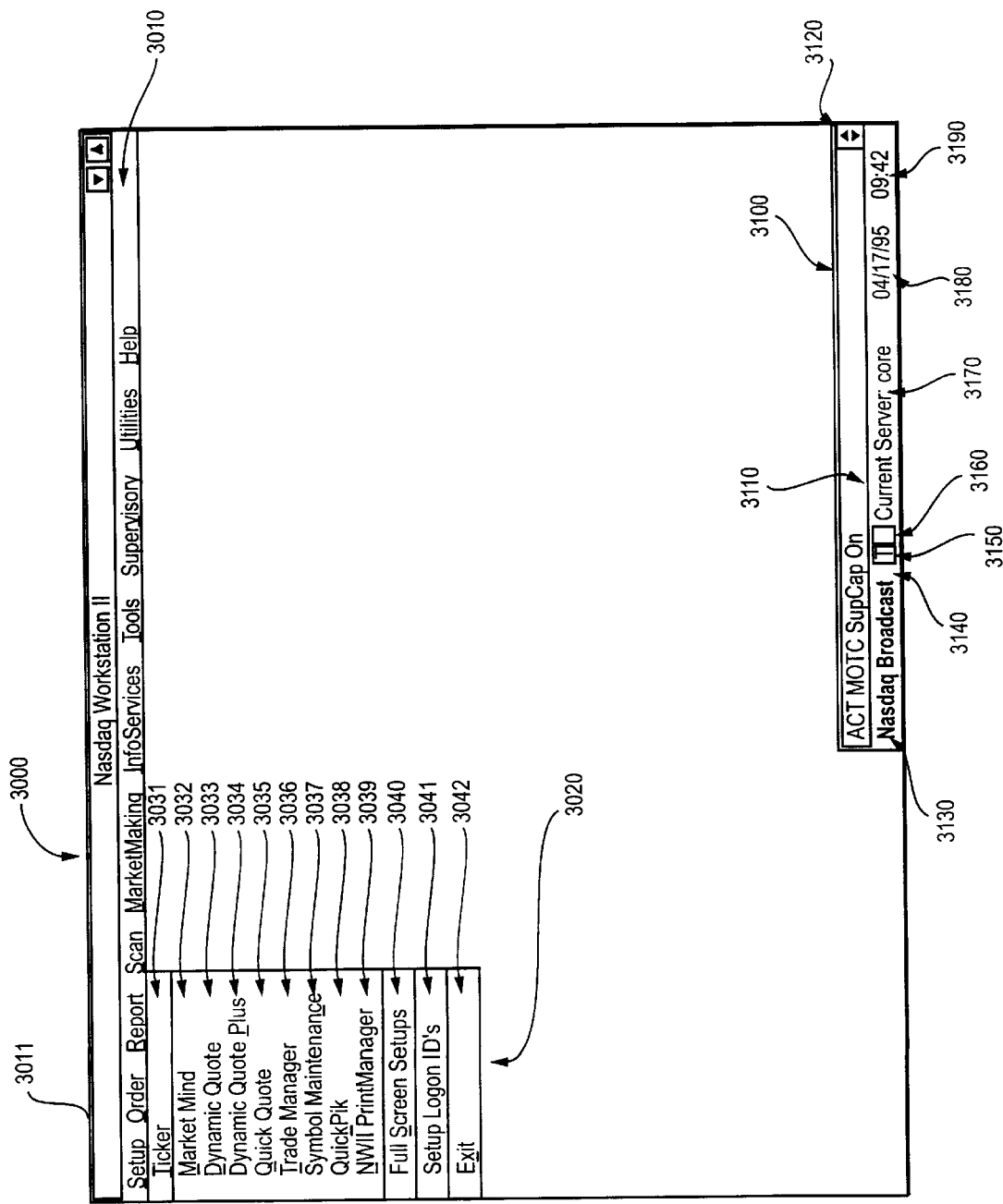
FIG. 3 is an illustration of a Main window of the preferred embodiment of the present invention.

Once the NWII software determines that the user is authorized, the NWII software presents Main window 3000, including menu bar 3010 shown in FIG. 3. Menu bar 3010 includes several pull-down menus such as menu 3020. The NWII software presents menu 3020 when the user selects Setup option 3011.

Pull-down menu 3020 includes user-selectable setup functions such as Ticker setup function 3031, Market Mind function 3032, Dynamic Quote setup function 3033, Dynamic Quote Plus setup function 3034, Quick Quote setup function 3035, Trade Manager function 3036, Symbol Maintenance function 3037, QuickPik setup function 3038, and Print Manager function 3039. Each setup function 3031–3039 causes the NWII software to display a setup window for the corresponding setup functions, and within each setup window, the user may open a corresponding display window. For example, the user may select Dynamic Quote setup function 3033 from pull-down menu 3020 causing the NWII software to present a display for setting up a Dynamic Quote window. The user may then open a Dynamic Quote window after the NWII software presents the setup window.

The user may instead select Full Screen Setups function 3040 from pull-down menu 3020. If the user selects Full Screen Setups function 3040, the NWII software allows the user to select either a screen display containing windows preselected by NWII system managers or the user's most recently configured screen display. The setup of Logon IDs and Exit functions 3041 and 3042, respectively, are self-explanatory.

The NWII software also displays a System status window 3100, shown in FIG. 3, whenever the user is not displaying windows lacking areas for displaying system messages. System status window 3100 includes message area 3110, scroll bar 3120, system text area 3130, status indicator area 3140, operating version area 3150, news indicator area 3160, server name area 3170, date area 3180, and time area 3190.

The NWII software places system messages in message area 3110. If all of the system messages cannot fit into message area 3110, then the user may use scroll bar 3120 to scroll up or down through the messages displayed in message area 3110. The NWII software displays the system name in system text area 3130.

Status indicator area 3140 allows the NWII software to display the current status of the system. A solid up arrow, illustrated in status indicator area 3140 of FIG. 3, indicates that the system is up. A solid down arrow indicates that the system is down. Of course, one skilled in the art would recognize that specific ways of indicating system status would be a matter of design choice.

Operating version area 3150 allows the NWII software to indicate what version of NWII the system is running. FIG. 3 shows "P" which corresponds to a production version 3150. The NWII software displays an "N" in news indicator area 3160 any time the system administrators transmit a news message. In server name area 3170, the NWII software displays "Current Server:" and the name of the user's current server. The NWII software displays the current date in date area 3180 and the current time in time area 3190.

The following description discusses certain of the windows corresponding to setup functions 3031–3039. Each description of a window begins with a description of the window, and closes with a description of a how to set up that window.

C. Dynamic Quote

The Dynamic Quote window will be the main focal point of activity for most users. Although users constantly scan the entire market, they will likely wish to concentrate on a single security. The Dynamic Quote window provides users with instant access to user-defined primary activities for a chosen security and to key pieces of information for that security. The Dynamic Quote window also allows users to monitor individual Market Maker quotations and other security data in real time. A Market Maker is an individual or corporation allowed by the Securities and Exchange Commission (SEC) to register individual securities for trading and makes a market in the issue.

Figure 4:
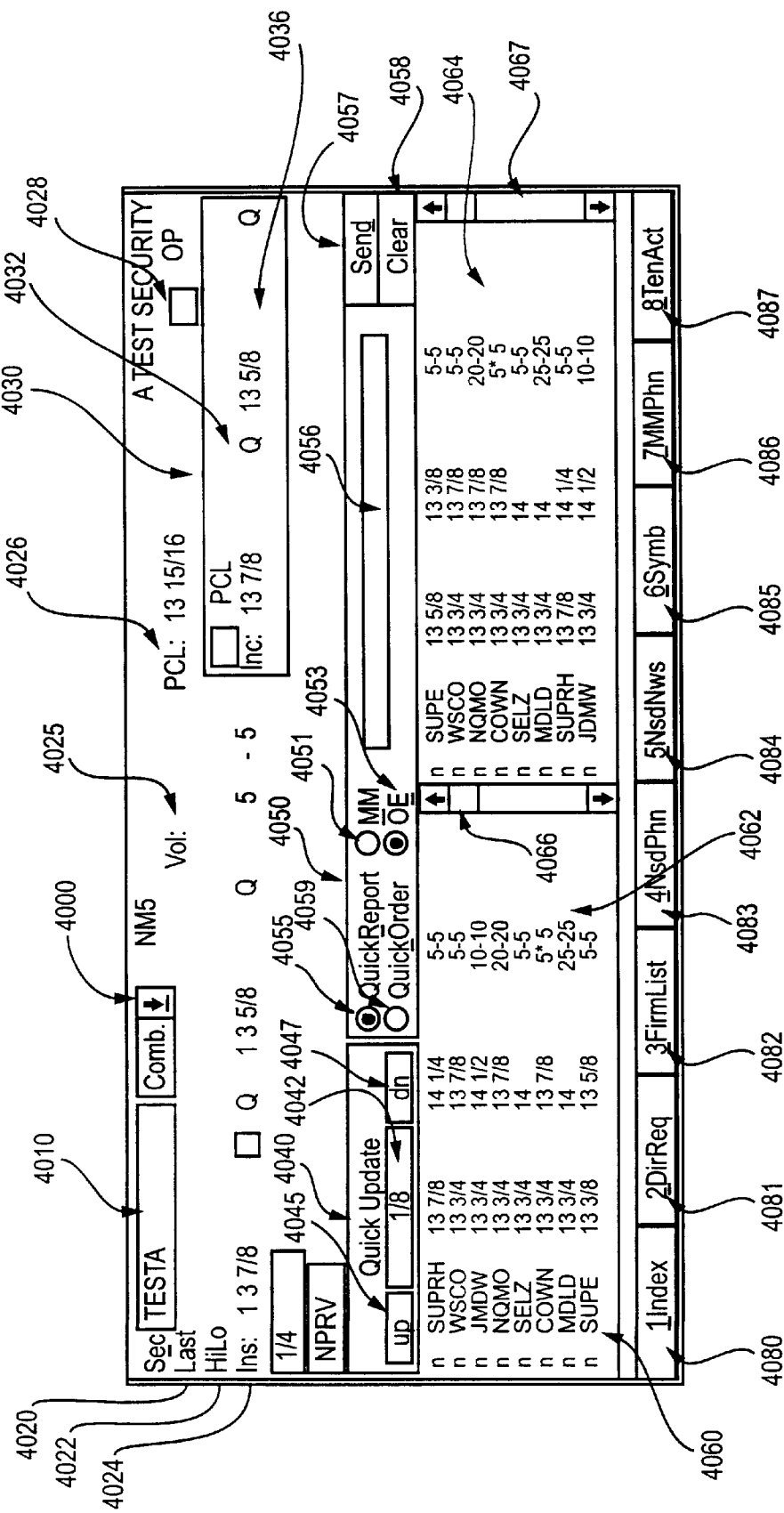
FIG. 4 is an illustration of a Dynamic Quote window.

FIG. 4 shows a Dynamic Quote window 4000. As discussed above with regard to FIG. 3, Dynamic Quote window 4000 may be accessed from Dynamic Quote setup function 3033, or Full Screen Setups function 3040, or via Screen Setup box 2080 if so configured.

To access the features of Dynamic Quote window 4000, the user types a name of a security in text box 4010. In response, the NWII software fills in various information fields of Dynamic Quote window 4000. In Last text area 4020, the NWII software fills in the last sale information for the identified security. In HiLo text area 4022, the NWII software fills in the high and low offers and bids for the identified security. In Ins text area 4024, the NWII software indicates the inside quote for the security. In Vol text area 4025, the NWII software fills in the volume of the market of the identified security. In PCL text area 4026, the NWII software fills in the previous day's closing price for the selected security.

In status area 4028, the NWII software uses a flag icon to indicate the market currently being viewed. If the domestic market is closed, the NWII software will display information for a foreign market that is open as determined by the NWII software. If the user wishes to switch between the domestic market and a foreign market, he selects market switching function (not shown).

Box 4030 contains information for foreign markets. Text area 4032 shows the previous day's closing price for the selected security, and text area 4036 shows the most recent inside quote information for the selected security. If the domestic market is closed and a foreign market is being displayed, box 4030 contains the previous day's closing price and most recent inside quote for the domestic market.

A user may change its offer and bid for the indicated securities by a designated Tick Size using buttons in Quick Update box 4040. Tick Size text box 4042 displays a default Tick Size for the selected security. The user changes the offer and bid by this tick value by selecting Up button 4045 or Dn button 4047.

The buttons and field in box 4050 allow the user to report trades or enter an order for a trade. A default condition of either reporting trades or entering orders is determined using a Dynamic Quote setup window as described below.

To report a trade, the user selects button 4055, enters appropriate information into text box 4056, and selects Send button 4057. The user may report a trade as either a Market Maker or an Order Entry Firm, depending on the user's designation. An Order Entry Firm is an individual or corporation allowed by the SEC to register securities for trading but is not making a market in an issue that they have an order.

After selecting button 4055, a mark in circle 4051 identifies the user as a Market Maker and a mark in circle 4053 identifies the user as an Order Entry Firm. A user can determine the defaults for the status and circles 4051 or 4053 using the Dynamic Quote Setup window described below. Selecting Clear button 4058 deletes all information in text box 4056 and resets circles 4051 and 4053 to their default values.

To enter an order, the user selects button 4059, enters appropriate information into text box 4056, and selects Send button 4057. To enter an order, the user may enter the order via SelectNet or any other type of order entry execution service. Both SelectNet and the other types of order entry execution services are automatic order execution services available to users. SelectNet allows users to enter an order as an agent or a principle for any number of shares and the other types of order entry services usually limit the number of shares which can be ordered. If a user selects button 4059, the NWII software will identify the other service by button 4051 and SelectNet by button 4053. Users determine the defaults for button 4051 or 4053 using the Dynamic Quote Setup window described below. Again, Clear button 4058 functions as described above.

As discussed above, buttons 4051 and 4053 serve different functions depending on whether the user is reporting a trade or entering a trade. If the user is entering a trade, buttons 4051 and 4053 indicate which order entry service is being selected. If the user is reporting a trade, buttons 4051 and 4053 indicate whether the user is reporting the trade as either a Market Maker or an Order Entry firm.

Box 4060 shows information for both offers and bids, or either offers only or bids only in the text boxes 4062 and 4064, depending on selections made during configuration as described below. If the user selects both offers and bids, the default option, the NWII software displays a ranked list of bids in text box 4062 and a ranked list of offers in text box 4064. Bids and offers are ranked by price and then by time. For example, the first bid or offer at the best price is listed first.

If all of the information cannot be displayed simultaneously, users may scroll text boxes 4062 and 4064 using scroll bars 4066 and 4067, respectively, which are standard features of many window products. Alternatively, if the user chooses to see offers only or bids only, the NWII software displays a ranked list of the offers bids which in both boxes 4062 and 4064.

Eight programmable buttons, 4080 through 4087, allow users to customize functions using the Dynamic Quote Setup window described below. To select a customized function, the user need only select the button corresponding to that function.

To set up a Dynamic Quote window such as window 4000, a user selects Dynamic Quote setup function 3033 (FIG. 3) from pull-down menu 3020. In response, the NWII software displays Dynamic Quote Setup window 5000, shown in FIG. 5. The user selects a particular Dynamic Quote window by highlighting one of the windows listed in Window list box 5010. If all of the Dynamic Quote Windows cannot be displayed at once, the user may scroll through the listed windows in Window list box 5010 using scroll bar 5011. Alternatively, the user may type the name of the window in Window text box 5015.

To delete the selected window, the user merely selects Delete button 5020. This removes the window from the entire system.

The user adds a new window by typing a name for the new window in text box 5015 and then pressing either the Add Before button 5021 or Add After button 5022. Add Before button 5021 adds the new window above the highlighted window name in Window list box 5010, and Add After button 5022 adds the window below the highlighted window name in Window list box 5010.

The user may also select a "hot key" which will cause the NWII software to immediately display the corresponding Dynamic Quote window from any other window. The user chooses a "hot key" from a drop down list displayed after the user selects combination box 5030.

The user may set certain information to be used as default information for the Dynamic Quote window 4000 using box 5040. The user selects buttons 5042 and 5043 to choose QuickOrder or QuickReport, respectively. Providing QuickOrder and QuickReport functions in Dynamic Quote window 4000 eliminates the need for the user to exit Dynamic Quote window 4000 to enter orders and report trades.

Selecting QuickOrder button 5042 causes the NWII software to select QuickOrder button 4059 as a default when Dynamic Quote window 4000 is opened. To place an order, a user enters information such as the buy or sell quantity, the security's symbol, and an identification of the firm or agency making the order.

Selecting QuickReport button 5043 causes the NWII software to select QuickReport button 4055 as a default when opening Dynamic Quote window 4000. To report a trade, a user enters information such as the buy or sell quantity, the security's symbol, and the identification for the firm or agency making the order.

Using buttons 5044 and 5045 selects an order entry service, such as a small order execution order service or SelectNet, respectively. NASD provides SelectNet, an order negotiating service, and small order execution services. The user must use SelectNet for orders above a certain number of securities.

To place an order using SelectNet, the user inputs information into text box 4056. That information may include user identification, whether the order is for a buy or a sell, and the price.

To place an order using the small order execution service, the user places similar information into text box 4056. One difference is that the price is limited to the market price. The order is then automatically executed without negotiation. Of course, other types of order execution services may be provided by NASD.

The user selects button 5046 to set the default type to Marker Maker, and selects button 5047 to set the default type to an Order Entry Firm. To insure that the values become defaults, the user must select Save button 5050. Otherwise the system uses the default values of Quick Order, SelectNet, and Market Maker. The user may also select Open button 5052 which causes the software to save the values as defaults and then open a Dynamic Quote window 4000.

Box 5070 lets the user set up the default display for text boxes 4062 and 4064. To display information about both offers and bids as the default, the user selects Combine button 5071. To display information about bids only, the user selects Bid Only button 5072. To display information about offers only, the user selects Offer Only button 5073.

In box 5080, the user sets up the programmable function buttons 4080 through 4087. Boxes 5081–5088 correspond respectively to buttons 4080–4087. For example, a user uses combination box 5086 to select the programmable function of button 4085 from a list of available functions. When the user selects combination box 5086, the software displays a list of functions which may be assigned to button 4085. From this list, the user selects the function to be assigned to button 4085.

At any time, but at least when all the desired changes have been made, the user selects Save button 5050 to cause the NWII software to save the changes. After the user has completed all changes and wishes to exit the Dynamic Quote setup function, the user presses End Setup button 5054 to cause the NWII software to close the Dynamic Quote setup window.

Several other buttons in Dynamic Quote Setup window 5000 provide additional capabilities for the user. For example, when the user selects Open button 5052, the NWII software opens the selected window. When the user selects Demo button 5056, the NWII software opens a demonstration window to show the user an example of a Dynamic Quote window for those users unfamiliar with NWII operation. When the user selects Color button 5058, the NWII software allows the user a select various colors for the selected Dynamic Quote window.

D. Dynamic Quote Plus

Figure 6:
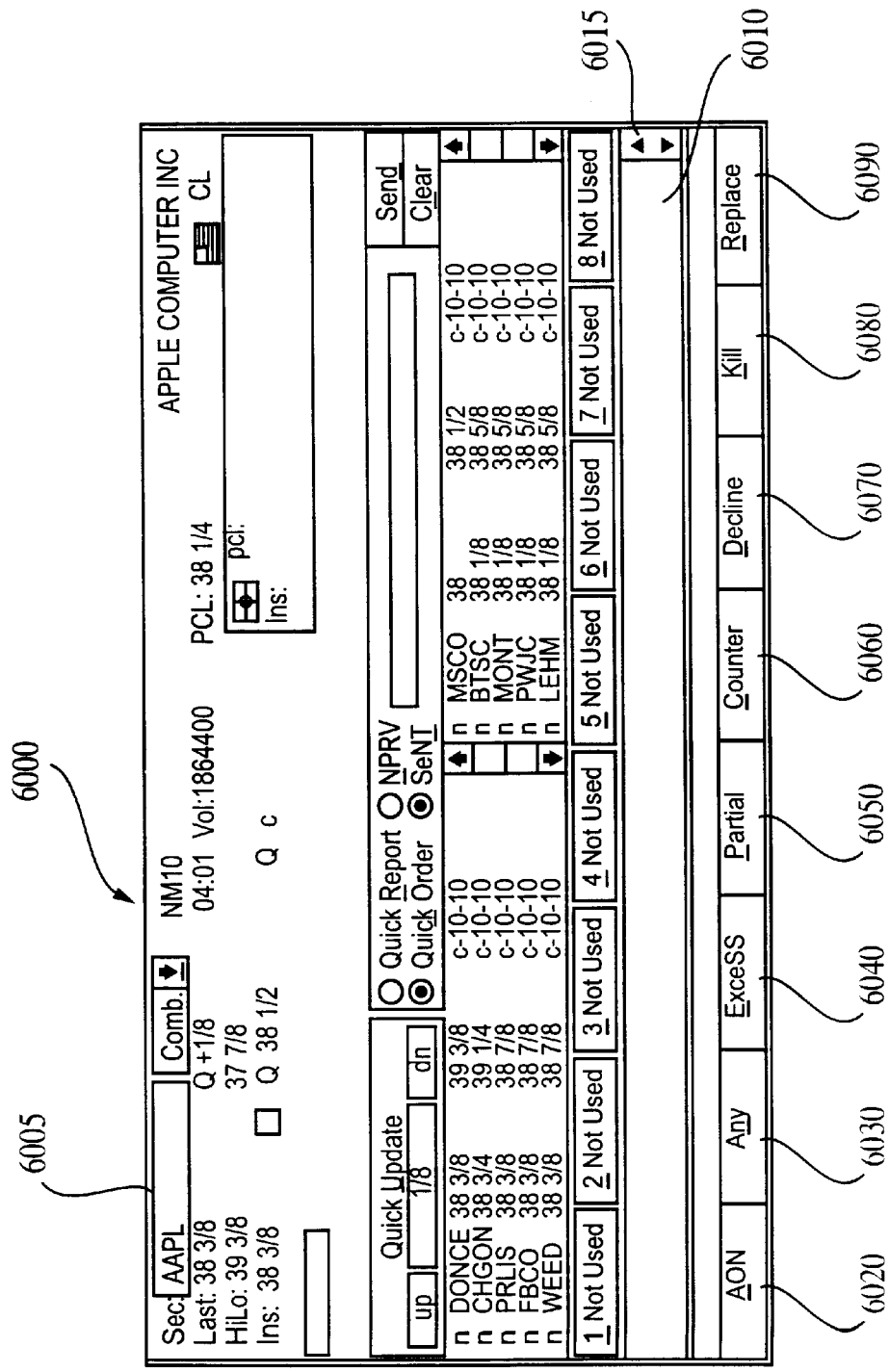
FIG. 6 is an illustration of the Dynamic Quote Plus window.

The Dynamic Quote Plus window 6000 shown in FIG. 6 is similar to the Dynamic Quote window 4000, but also allows the user to view and perform activities to manage trades in a particular security.

Dynamic Quote Plus window 6000 may be accessed from pull-down menu 3020 using Dynamic Quote Plus setup function 3034 or Full Screen Setups function 3040, or via Screen Setup box 2080 if so configured. For brevity, the fields of Dynamic Quote Plus window 6000 that operate the same as corresponding features of Dynamic Quote window 4000 will not be explained again. In text box 6010, the NWII software will display all messages related to the security identified in box 6005. If all of the messages associated with a particular security cannot be displayed simultaneously, the user may scroll throughout the entire list using the scroll button 6015.

The user selects buttons 6020 through 6090 to manage a particular security. AON button 6020 allows the user to accept an order "All or Nothing." This is done when a user only wants to accept an order only in its entirety. If the user selects AON button 6020, the NWII software will accept the order only if no other users have accepted portions of the order.

Any button 6030 allows the user to accept any portion of an order regardless of whether other users have accepted portions of the order. ExecSS button 6040 allows the user to execute a short sell. A user executes a short sell when he sells securities he does not currently own but will buy at a later date. Obviously, in those instances the user hopes the later price is lower then the price at which he has just sold.

When the user selects Partial button 6050, the software displays a negotiation window so that the user may accept a portion of an order. When the user selects Counter button 6060, the software displays a negotiation window so that the user may counter an order.

Selecting Decline button 6070 allows the user to decline a preferential order. A preferential order is an order directed to a Market Maker in a particular issue. A preferential order sent at the Market Maker's quote may create liability because the Market Maker may have to execute some portion of the order.

When the user selects Kill button 6080, the software cancels all open orders for the user. Replace button 6090 allows the user to cancel an open order and replace it with a new order.

Figure 7:
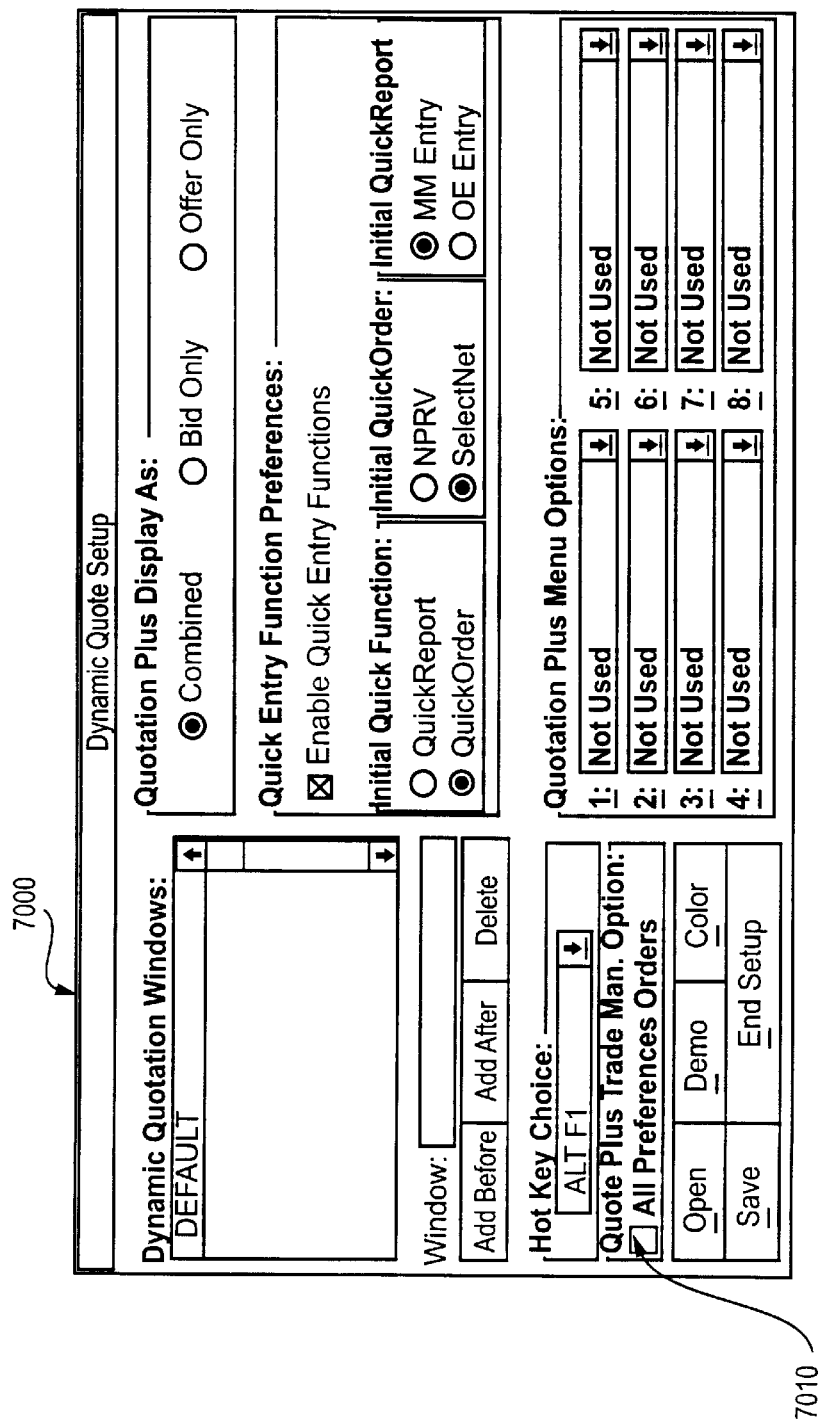
FIG. 7 is an illustration of the Dynamic Quote Plus setup window.

The Dynamic Quote Plus setup window 7000 shown in FIG. 7 operates similar to the setup window Dynamic Quote setup window 5000 but includes an additional box 7010. If the user selects box 7010, the NWII software displays all preferential orders for securities in text box 6010. The default for this option is not to display preferential orders for all securities.

E. Quick Quote

The Quick Quote function provides a user quick access to commonly requested information quickly, and allows users to give commonly needed inputs quickly. For example, a user may view the best bid, offer, and last sale of a specific security, view the user's own quote for a specific security, monitor the depth of the market for that security (if the user is a Market Maker in the security), update a quote for a security, and enter a trade report or order.

Figure 8:
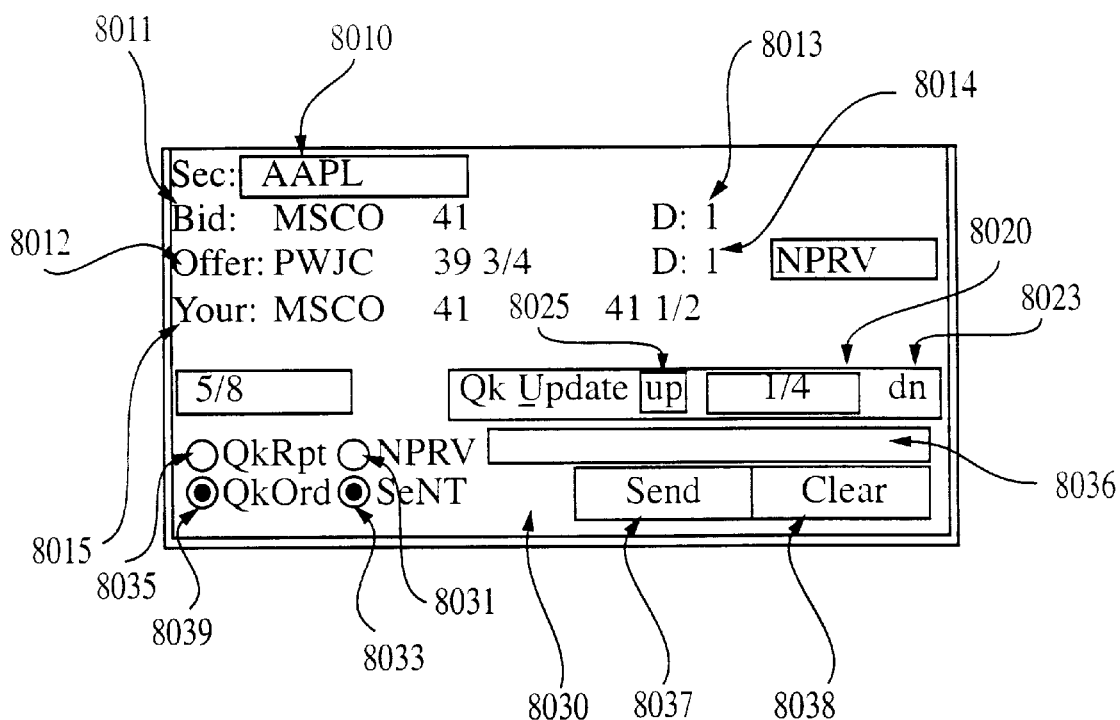
FIG. 8 is an illustration of a Quick Quote window.

When the user opens a Quick Quote window from pull-down menu 3020 using either Quick Quote setup function 3035 or Full Screen Setups function 3040, or via Screen Setup box 2080 if so configured, the NWII software presents the user with Quick Quote window 8000 as shown in FIG. 8. The user then enters a security's symbol in text box 8010, and the NWII software displays the highest bid for that security in the Bid text area 8011 and the lowest offer in Offer text area 8012. A security's symbol is determined by the Compliance section of the SEC and the Market Operations personnel.

If the user is a Market Maker, the NWII software displays the depths of the bid and offer markets in text areas 8013 and 8014, respectively. The NWII software updates these values as changes occur in the system. If the user is a Market Maker, the NWII software also displays the user's own bid and offer in "Your" text area 8015.

The Quick Update box 8020 allows the user to update quotes quickly by specific amounts similar to the Quick Update box 4040 in FIG. 4. The buttons and text field in box 8030 also operate similarly to the box 4050 of FIG. 4 and allow a user to report trades or enter an order.

Figure 9:
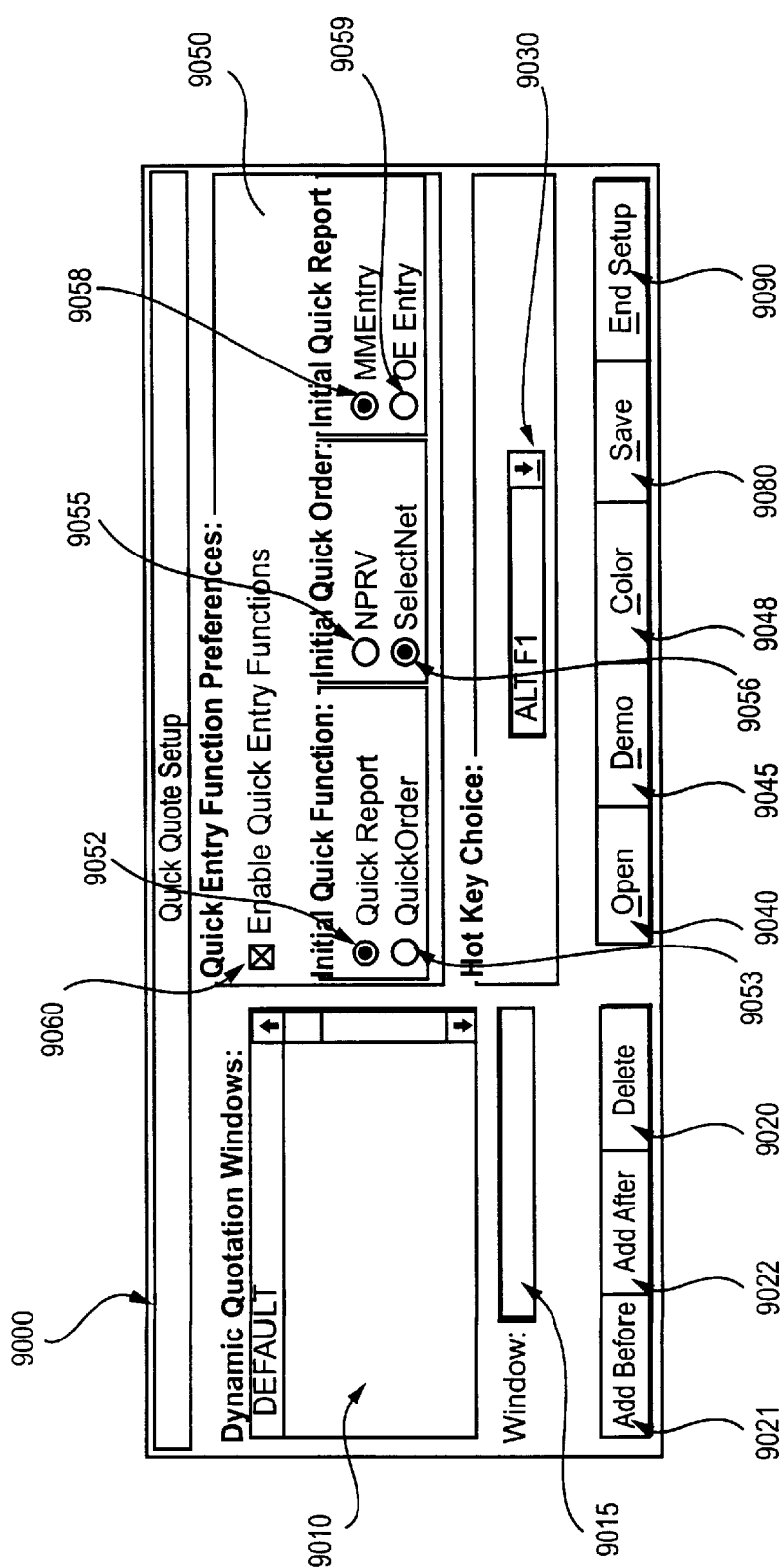
FIG. 9 is an illustration of a Quick Quote setup window.

To set up a Quick Quote window, a user selects Quick Quote setup function 3035 from pull-down menu 3020 (FIG. 3), and the NWII software presents a Quick Quote setup window 9000 as shown in FIG. 9. The user selects which Quick Quote window to configure or create using boxes 9010 and 9015 and buttons 9020–9022 similar to the use of boxes 5010 and 5015 and buttons 5020–5022 in window 5000 of FIG. 5.

The user may designate a "hot key" to cause the NWII software to immediately display a Quick Quote window to the user from any other window. To choose a "hot key" button for the selected window, the user selects the keys using combination box 9030.

Several other buttons in Quick Quote Setup window 9000 provide additional capabilities for the user. For example, when the user selects Open button 9040, the NWII software opens the selected window. When the user selects Demo button 9045, the NWII software opens a demonstration window to show the user an example of a Quick Quote window. When the user selects Color button 9048, the NWII software allows the user a select various colors for the selected Quick Quote window.

In box 9050, Setup Window 9000 also allows the user to set certain default values for the selected Quick Quote window 8000. The user may use buttons 9052 and 9053 to select either QuickOrder or QuickReport, respectively, as a default state. The user may also use buttons 9055 and 9056 to select a small order execution service or SelectNet, respectively. The user selects button 9058 to set the default type for the selected window to Marker Maker, and selects button 9059 to set the default type to an Order Entry Firm. If the user does not select button 9060, quick entry functions are not enabled.

At any time, but at least after the user has completed all of the desired changes, the user should select Save button 9080 to cause the NWII software to save the changes. When the user wishes to exit the Setup function, the user presses End Setup button 9090, which causes the NWII software to close the Symbol Maintenance window.

F. QuickPik

Figure 10:
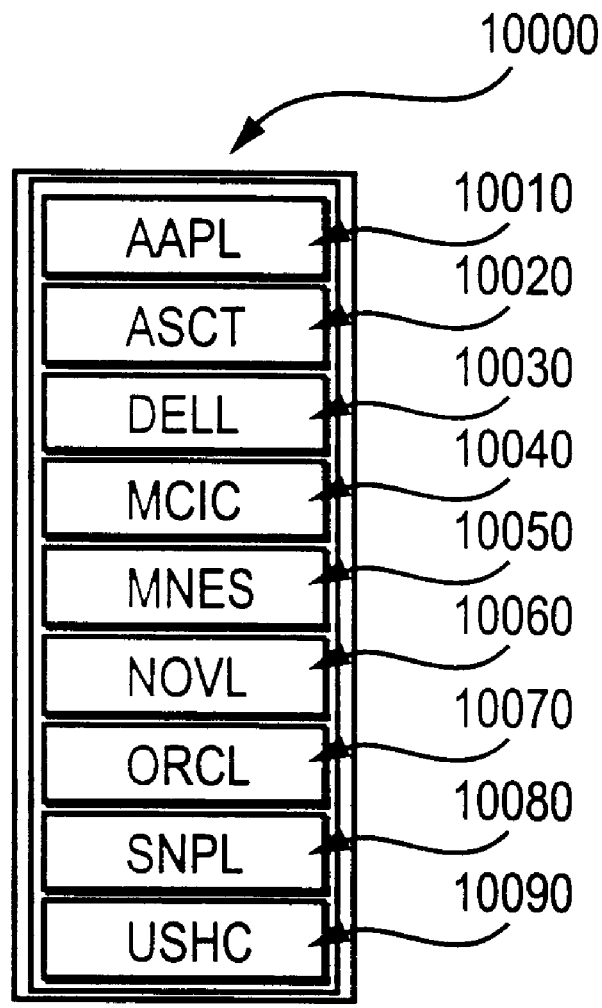
FIG. 10 is an illustration of a QuickPik window.

When the user opens a QuickPik window from pull-down menu 3020 using either QuickPik setup function 3038 or Full Screen Setups function 3040, or via Screen Setup box 2080 if so configured, the NWII software presents the user with a QuickPik window 10000 as shown in FIG. 10.

QuickPik window 10000, allows the user to open a Dynamic Quote or Dynamic Quote Plus window immediately for an individual security. For example, FIG. 10 shows a QuickPik window twenty-four securities icons. When the user selects an icon button associated with a particular security, then the NWII software opens a Dynamic Quote window and presents it to the user. If a Dynamic Quote window is already displayed for the selected security, the software moves that Dynamic Quote window to the foreground.

Each button is associated with a particular security. Thus, the user selects icon button 10010 to open a Dynamic Quote or Quick Quote window for a security symbol displayed on icon button 10010. Users determine the number of icon buttons as well as the securities associated with each icon button when setting up QuickPik window 11000.

Figure 11:
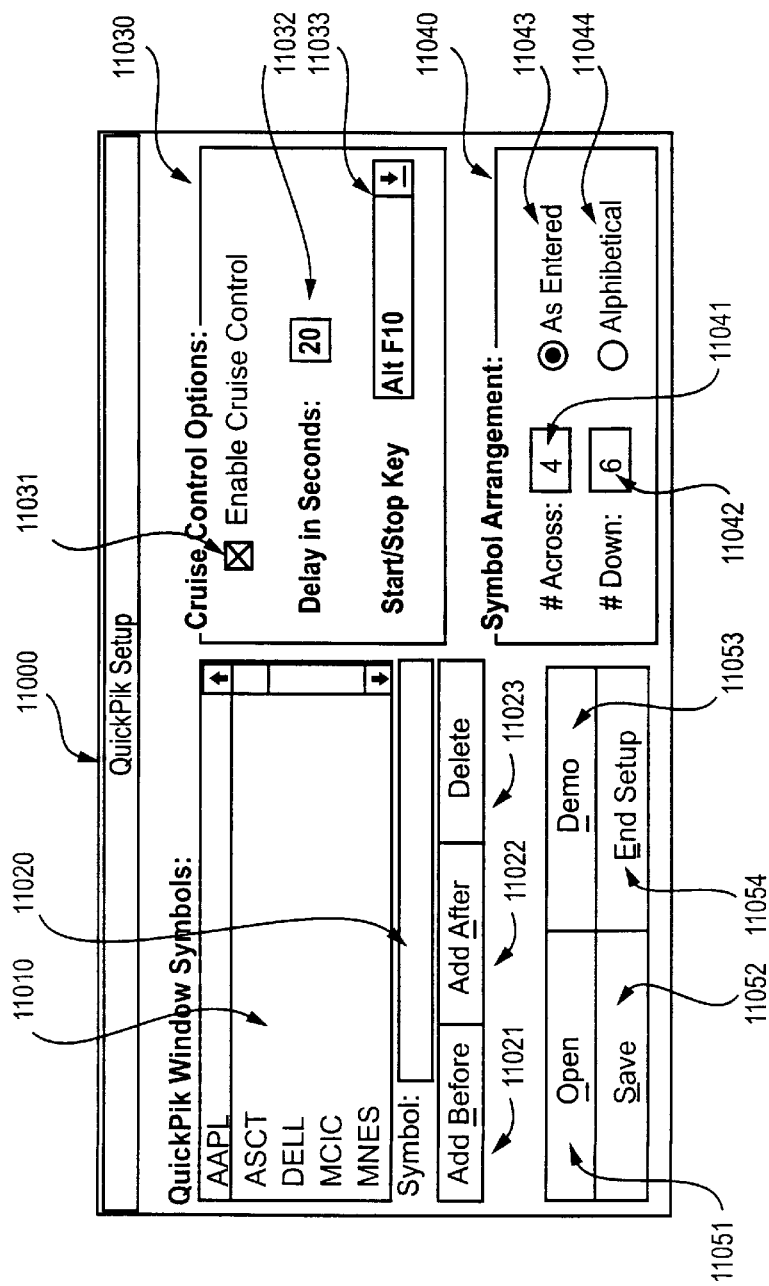
FIG. 11 is an illustration of a QuickPik setup window.

When the user selects QuickPik setup function 3038 from pull-down menu 3020 (FIG. 3), the NWII software presents a QuickPik setup window 11000 as shown in FIG. 11. The user selects which QuickPik window to configure or create using boxes 11010 and 11015 and buttons 11021–11023 similar to the use of boxes 5010 and 5015 and buttons 5020–5022 in window 5000 of FIG. 5.

The user sets options for automatic sequencing through buttons displayed in QuickPik window 100000 using Cruise Control Option box 11030. If the user selects Enable Cruise Control button 11031, then the NWII software will enable the cruise control feature which causes the NWII software to sequence through windows associated icons buttons in FIG. 5 just as if the user were actually selecting those icon buttons in sequence.

In text box 11032, the user enters a delay, in seconds, that the NWII software will wait before displaying a next Dynamic Quote or Quote Plus window. By choosing a particular start/stop key from combination box 11033, the user can stop the NWII software from sequencing until the selected start/stop key is pressed again.

The user sets certain display options for QuickPik window using Symbol Arrangement box 11040. In box 11041, the user enters the number of icon buttons displayed across the screen. The user enters a number of icon buttons which will be displayed down the screen in box 11042.

If the user selects button 11043, the NWII software arranges the securities in the order according to text box 11010. If the user selects box 11044, the NWII software arranges the symbols alphabetically.

Buttons 11051 through 11054 operate similarly to the similarly named buttons in window 5000.

G. Tickers

Figure 12:
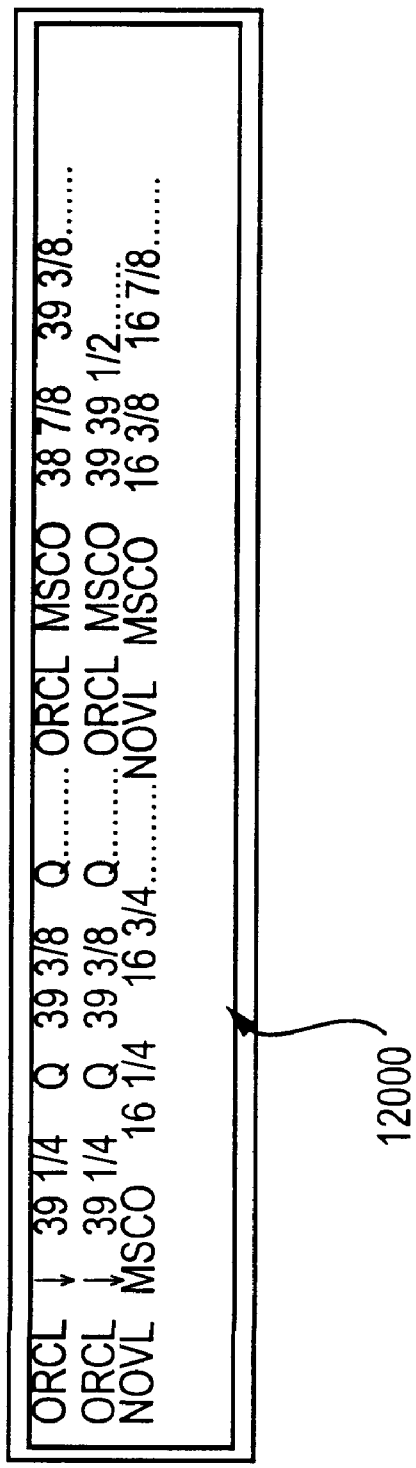
FIG. 12 is an illustration of a Ticker window.

The user opens a Ticker window from pull-down menu 3020 using either Ticker setup function 3031, Full Screen Setups function 3040, or Screen Setup box 2080 if so configured. Once the Ticker window is selected, the NWII software presents the user with a Ticker window 12000 as shown in FIG. 12.

Ticker window 12000 displays every trade and quote update for all or a selected portion of all securities. The ticker may display last sale trade reports, Market Maker quotation changes, and inside quote changes for all equities.

Figure 13:
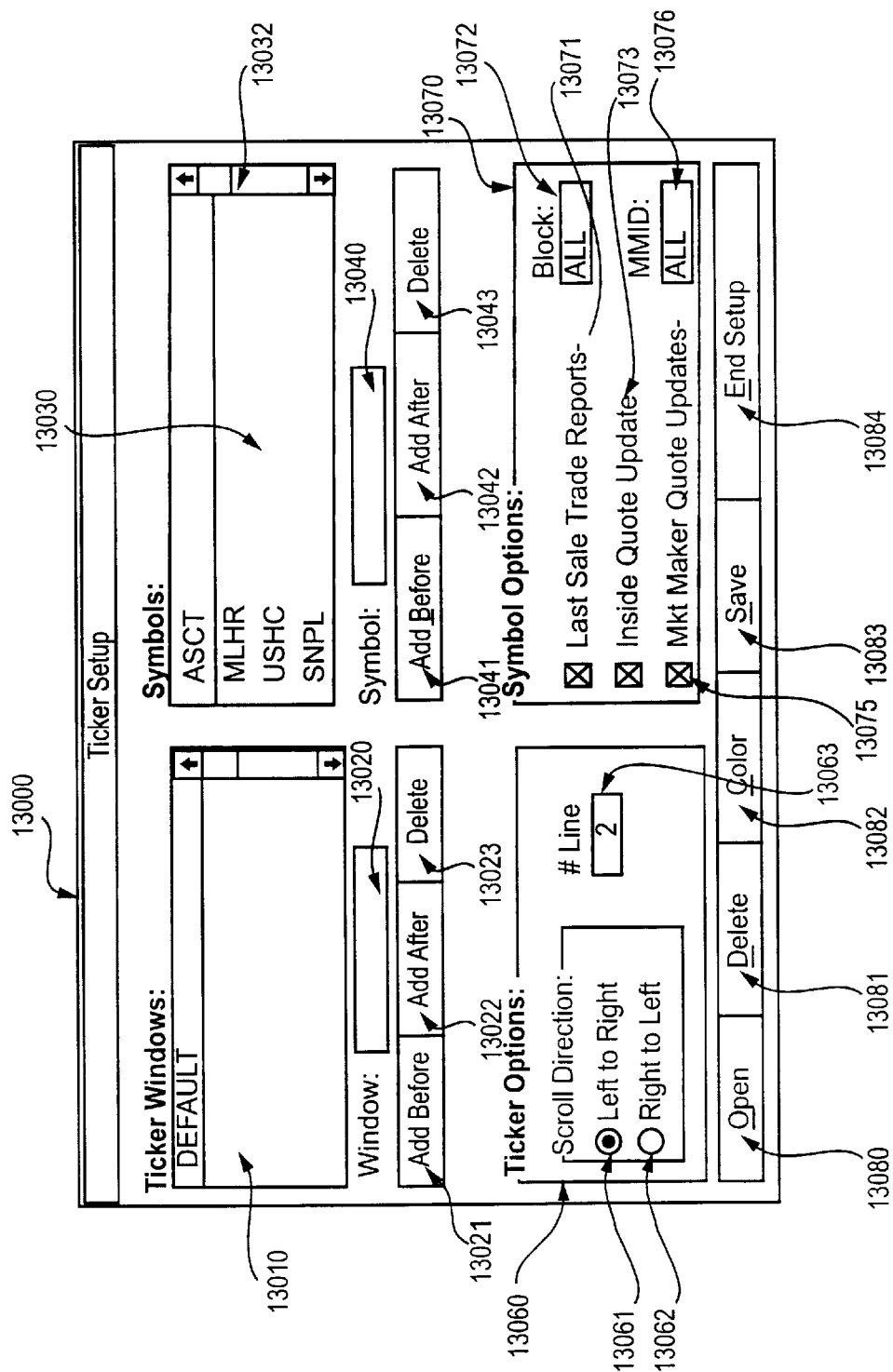
FIG. 13 is an illustration of a Ticker setup window.

When the user selects Ticker setup function 3031 from pull-down menu 3020, the NWII software presents a Ticker setup window 13000 as shown in FIG. 13. The user selects which Ticker window to configure or create using boxes 13010 and 13020 and buttons 13021–13023 similar to the use of boxes 5010 and 5015 and buttons 5020–5022 in window 5000 of FIG. 5.

Once the user has selected a particular ticker window, the NWII software displays in box 13030 all of the securities included in the selected ticker window. If all of the symbols for the selected securities cannot fit into one screen, the user may use scroll bar 13032.

Users may add or delete securities from a selected ticker window using the boxes 13030 and 13040 and buttons 13041 through 13043 similar to boxes 13010 and 13020 and buttons 13021–13022.

The ticker options in Ticker Options box 13060 allow the user to change a scroll direction of the ticker and the number of lines the ticker occupies. The user selects button 13061 to set the scroll direction as left to right and button 13062 to set the scroll direction as right to left. In box 13063, the user inputs the number of lines for a particular ticker. The number can vary from two to the total number of lines on a full page.

The symbol options in Symbol options box 13070 allow a user to tailor the information displayed in the ticker for a particular security. Selecting box 13071 causes the NWII software to display last sale trade reports. Selecting box 13072 indicates the minimum share amount of the displayed reports. Selecting box 13073 causes the NWII software to display any changes to the inside quotes. Selecting box 13075 causes the NWII software to display the Market Maker quote updates. Box 13076 identifies the Market Makers whose quotes will be displayed.

Figure 5:
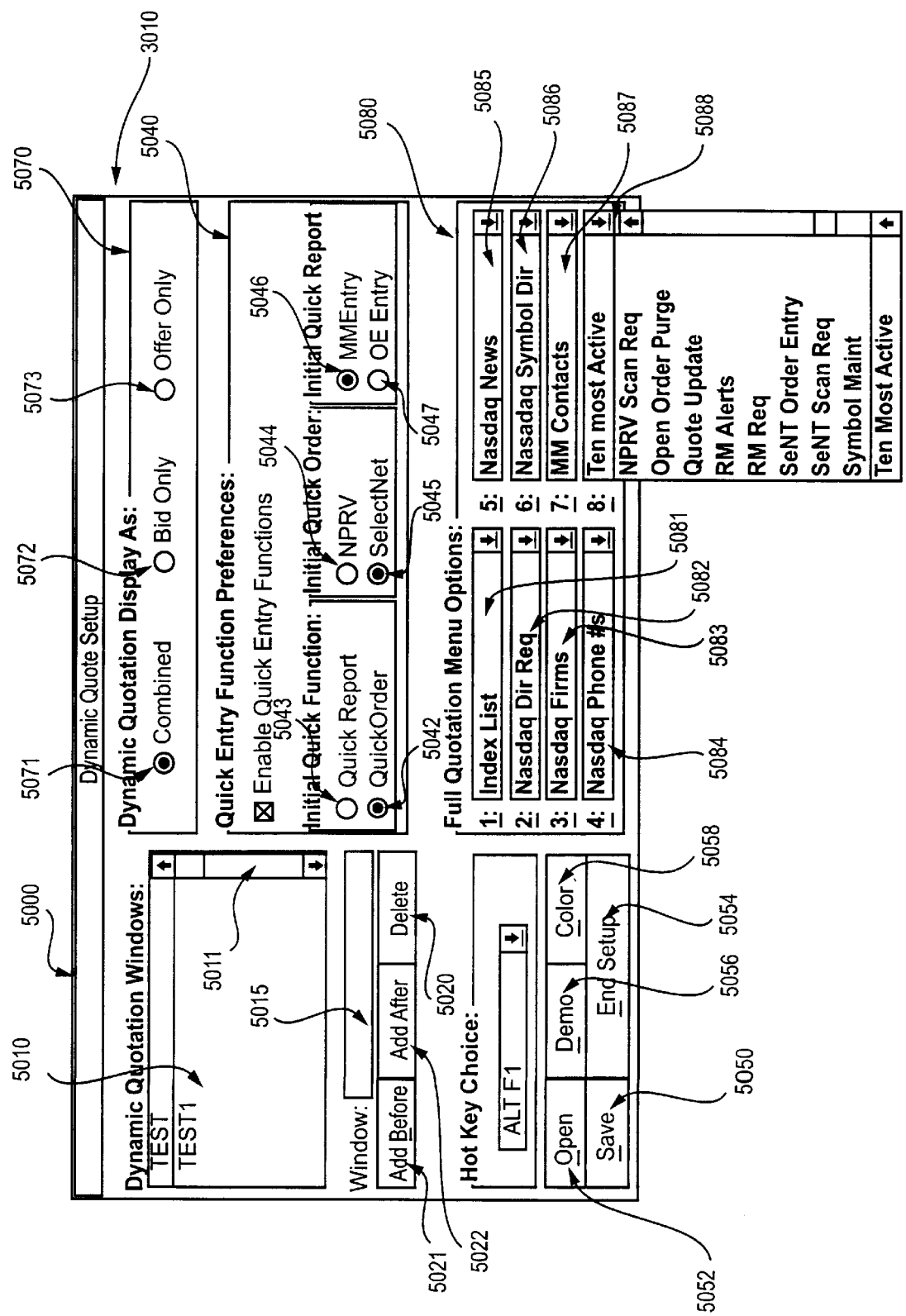
FIG. 5 is an illustration of a Dynamic Quote setup window.

Buttons 13080 through 13084 operate as the similarly named buttons in window 5000 of FIG. 5.

H. Symbol Maintenance

Figure 14:
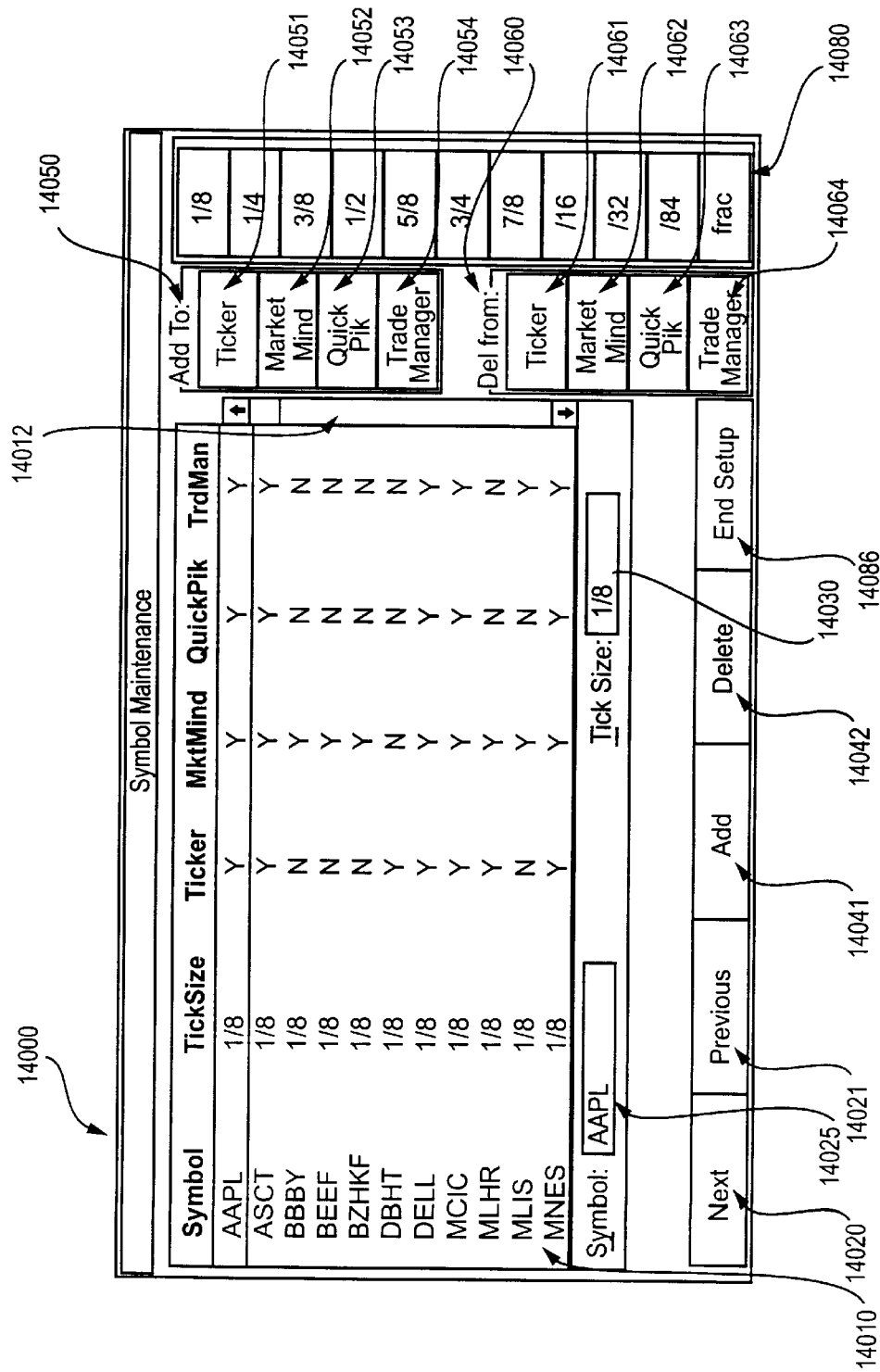
FIG. 14 is an illustration of a Symbol Maintenance window.

When the user selects Symbol Maintenance from pull-down menu 3020 using either Symbol Maintenance setup function 3037 or Full Screen Setups function 3040, or via Screen Setup box 2080 if so configured, the NWII software presents the user with Symbol Maintenance window 14000 shown in FIG. 14.

Symbol Maintenance window 14000 provides a central location for the user to view which securities are displayed in the various windows. Window 14000 allows the user to see the securities the user has chosen and provides a mechanism for the user to add or delete securities for other windows. Window 14000 also allows the user to change the default Tick Size and specify a separate SOES tick.

Window 14000 includes text box 14010 containing all of the symbols for securities the user has selected. For each of the symbols for the securities that the user has chosen, the NWII software will indicate Tick Size, SOES Tick Size, if there is one, and which of the various windows the security is included. For example, the security "AAPL" highlighted in FIG. 14 has a Tick Size of ⅛ and is included in a Ticker window, a MarketMind, a Trade Manager, and a QuickPik window. If all of the symbols cannot be displayed simultaneously in text area 14010, a user may scroll through symbol list using the scroll bar 14012.

To select a security, the user can use the Next button 14020 or Previous button 14021 to choose securities adjacent to the one currently selected, or the user can specify a particular security directly. To specify a security directly, a user would type the security into symbol text box 14025.

Once the user selects a security, the NWII software places the corresponding Tick Size for that security in Tick Size box 14030. To add a new security, the user merely enters the corresponding symbol in the text area 14025 and presses the Add button 14041. The Tick Size for this newly added security is initially the default Tick Size set by the NWII system managers. Initially, the security symbol is not displayed in any other windows. To delete a security from all windows, the user selects the security and then selects Delete button 14042.

To add the currently selected symbol to a particular window, the user merely selects a button corresponding to the desired window from button area 14050. For example, the user would select Ticker button 14051 to add the selected symbol to a Ticker window. The user would select Market Mind button 14052 to add the selected symbol to a Market Mind window, QuickPik button 14053 to add the selected symbol to the QuickPik window, and Trade Manager button 14054 to add the selected symbol to a Trade Manager window.

The user may delete the selected security from a particular window in an analogous manner using the buttons in area 14060. Buttons 14061 to 14064 correspond to buttons 14051 to 14054. The user may change the selected security's Tick Size by either typing the desired value in Tick Size box 14030 or by selecting one of the buttons in the area 14080 corresponding to the desired Tick Size.

To exit the Symbol Maintenance function, the user presses End Setup button 14086, which causes the NWII software to close the Symbol Maintenance window and to save any changes made since the last time the same button was selected when the user has completed all of the desired changes.

I. Conclusion

It will be apparent to those skilled in the art that various modifications and variations can be made in the implementation and structure of the present invention without departing from the scope or spirit of the invention. For example, different input devices could be used to enter information into the system including, a mouse, a touch screen, voice input, an input pad, or similar devices. Similarly, the level of centralization of information may be left to the designer as well as the hardware configuration to implement the method.

Other embodiments of the invention will be apparent to those skilled in the art from consideration of the specification and practice of the invention disclosed herein. The specification and examples are exemplary only. The true scope and spirit of the invention is indicated by the following claims.

What is claimed is:

1. A method for customizing a display in a data processing system over which securities are traded, comprising:

providing an interface with a securities exchange system over which securities are traded, wherein a system display database contains information about the security exchange system;

receiving a first input from a user requesting a maintenance display indicating which of a plurality of system monitors display information about a desired security;

displaying the maintenance display in response to the first input;

receiving a second input from the user indicating a change in which of the plurality of system monitors display information about the desired security;

updating the system display database to reflect the changes indicated by the second input;

displaying transaction information about the desired security;

receiving a third input from the user indicating changes to the transaction information regarding the desired security;

updating the system display database according to the third input;

altering the maintenance display according to the third input;

displaying information about a Tick Size for the desired security;

receiving a fourth input from the user to change the Tick Size of the desired security; and updating the system display to reflect the change indicated by the fourth input.

2. The method according to claim 1, further comprising: altering the maintenance display to reflect the change indicated by the second input.

3. The method according to claim 1, further comprising: receiving a fifth input from the user representing the desired security being traded on the securities exchange system; and displaying pre-selected information about the desired security in response to the fifth input.

4. The method according to claim 1, wherein the plurality of system displays are windows.

5. A method for customizing a display in a data processing system over which securities are traded, comprising:

providing an interface with a securities exchange system over which securities are traded, wherein a system display database contains information about the security exchange system;

receiving a first input from a user requesting a maintenance display indicating which of a plurality of system monitors display information about a desired security;

displaying the maintenance display in response to the first input;

receiving a second input from the user indicating a change in which of the plurality of system monitors display information about the desired security;

updating the system display database to reflect the changes indicated by the second input;

displaying transaction information about the desired security;

receiving a third input indicating changes to the transaction information regarding the desired security;

updating the system display database according to the third input;

altering the maintenance display according to the third input;

displaying an indication of a user's authorization to use an automated ordering service for the desired security; and displaying, if the user is authorized to use the automated ordering service, information about the Tick Size of the desired security for the automated ordering service.

6. The method according to claim 5, further comprising: receiving a fourth input from the user to change the Tick Size for the automated ordering service; and updating the system display database to reflect the change indicated by the fourth input.

7. A method of providing information on a desired security, comprising:

providing a user interface with a securities exchange system for trading securities, wherein a plurality of users trade securities each security having an associated set of information;

receiving a first input from the user requesting a dynamic display for the desired security, the dynamic display containing a subset of information selected using a setup display for customizing the subset of information in the dynamic display from the set of information associated with the desired security;

displaying the dynamic display containing the subset of information for the desired security;

receiving a second input from the user specifying a trade of the desired security;

executing the trade;

reporting the trade to the securities exchange system; and wherein displaying the dynamic display further comprises:

displaying a Tick Size for the desired security;

receiving a third input from the user indicating a change in a bid and an offer by the user for the desired security by the Tick Size;

transmitting the change in the bid or offer to the securities exchange system; and changing the display to reflect the change in the bid and the offer by the Tick Size.

8. The method according to claim 7, wherein displaying the dynamic display further comprises:

displaying a lowest offer and a highest bid.

9. The method according to claim 8 wherein a bid market depth is a number of market makers making bids on the desired security, a market maker being a trading firm registered with the securities exchange system to trade the desired security, and an offer market depth is a number of market makers making offers on the desired security, and wherein displaying the dynamic display further comprises:

displaying the bid market depth and the offer market depth for the desired security.

10. The method according to claim 8, wherein a market maker is a trading firm registered with the securities exchange system to trade the desired security according to a market maker offer and a market maker bid, and wherein displaying the dynamic display further comprises:

displaying a user offer and a user bid.

11. The method according to claim 7, further comprising:

ordering an amount of the desired security through an automated exchange service which automatically executes an order.

12. The method according to claim 7, wherein securities are traded using bids, representing how much money the user will pay for the desired security, and the associated set of information includes the bids associated with the desired security, and displaying the dynamic display further comprises:

allowing the user to obtain a display of the bids associated with the desired security.

13. The method according to claim 7, wherein securities are traded using bids, representing how much money the user will pay for a security, and offers, representing how much money a user will accept for the desired security, wherein the associated set of information includes bids and offers associated with the desired security, and displaying the display further comprises:

allowing the user to obtain a display of the bids and the offers associated with the desired security.

14. The method according to claim 7, wherein securities are traded using offers, representing how much money a user will accept for the desired security, and wherein the associated set of information includes the offers associated with the desired security, and displaying the dynamic display further comprises:

allowing the user to obtain a display of the offers associated with the desired security.

15. The method according to claims 7, further comprising:

displaying a set of available functions;

receiving a third input from the user identifying a desired subset of the available functions;

displaying the desired subset of available functions in the display for the desired security;

allowing the user to select a function from the subset of available functions; and executing the selected function.

16. The method according to claim 7, wherein displaying the display further comprises:

displaying trade request information from a plurality of other users; and wherein executing a trade further includes:

communicating the user's trade requests with the plurality of other users.

17. The method according to claim 7 further comprising:

allowing the user to monitor individual market makers quotations in real time.

18. The method according to claim 7, further comprising:

allowing the user to switch between markets from which the subset of information is being viewed.

19. The method according to claim 18, further comprising:

displaying a flag indicating a market from which the subset of information is being viewed.

20. The method according to claim 7, wherein the second input is generated by selecting a button in the dynamic display.

21. The method according to claim 20, further comprising:

entering the appropriate trade information in a text field in the dynamic display; and selecting a send button in the dynamic display.

22. The method according to claim 7, wherein reporting the trade is enter by the user selecting a button in the dynamic display.

23. The method according to claim 7, further comprising:

selecting a button in the dynamic display to report a trade as either a market maker or an order entry firm depending on the user's designation.

24. The method according to claim 7, further comprising:

selecting a button in the dynamic display to execute a trade as either a market maker or an order entry firm depending on the user's designation.

25. The method according to claim 7 wherein the user has a plurality of dynamic displays listed on a maintenance display.

26. The method according to claim 25 wherein the user may select a hotkey displaying a selected dynamic display from each of the plurality of dynamic displays.

27. The method according to claim 7 wherein executing the trade further includes:

placing an order using an order negotiating service.

28. The method according to claim 27 wherein the order negotiating service is SelectNet®.

29. The method according to claim 7 wherein executing the traded further comprises:

placing an order using a small order execution service.

* * * * *